(12) United States Patent
Lu et al.

(10) Patent No.: US 8,543,731 B2
(45) Date of Patent: Sep. 24, 2013

(54) METHOD FOR CONTENT RESPONDING AND CONTENT REQUESTING, CONTENT RESPONDER AND CONTENT REQUESTOR

(75) Inventors: Zhong Yan Lu, BeiJing (CN); Jian Hong Shan, Beijing (CN); Shao Yang Yu, BeiJing (CN); Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1342 days.

(21) Appl. No.: 11/946,161

(22) Filed: Nov. 28, 2007

(65) Prior Publication Data
US 2008/0133811 A1 Jun. 5, 2008

(30) Foreign Application Priority Data

Nov. 29, 2006 (CN) .......................... 2006 1 0162912

(51) Int. Cl.
*G06F 12/00* (2006.01)
*G06F 15/16* (2006.01)

(52) U.S. Cl.
USPC ............ 709/244; 709/229; 709/231; 709/234

(58) Field of Classification Search
USPC ......................................................... 710/244
See application file for complete search history.

(56) References Cited

U.S. PATENT DOCUMENTS

| 5,768,515 | A | | 6/1998 | Choquier et al. |
| 5,931,904 | A | * | 8/1999 | Banga et al. .................. 709/217 |
| 5,948,066 | A | * | 9/1999 | Whalen et al. ................ 709/229 |
| 6,178,461 | B1 | * | 1/2001 | Chan et al. .................... 709/247 |
| 6,260,066 | B1 | * | 7/2001 | Bittinger et al. .............. 709/224 |
| 6,697,844 | B1 | * | 2/2004 | Chan et al. .................... 709/206 |

FOREIGN PATENT DOCUMENTS
WO 02/054258 A1 7/2002

* cited by examiner

*Primary Examiner* — Moustafa M Meky
*Assistant Examiner* — Blake Rubin
(74) *Attorney, Agent, or Firm* — Steven L. Nichols; Van Cott, Bagley, Cornwall & McCarthy P.C.

(57) ABSTRACT

The present invention sets forth a method for content responding, a method for content requesting, a content responder and a content requester. A content responder receives a first request from a content requester via a network. Then, the content responder generates a first content based on the first request. Then the content responder receives a second request from the content requester via the network. Then, the content responder generates a second content based on the second request. Next, the content responder compares the second content with the first content. After that, the content responder transmits a second response with regard to the second request to the content requester via the network. The second response is generated based on the result of comparison. According to the invention, if there is a very small difference between the first content and the second content, network bandwidth can be saved, the transmitting time of content will be reduced, and thus the waiting time of the user to view content will be reduced. The present invention is particular beneficial to the existing industries (for example, the banking industry) that adopt narrow band network widely.

12 Claims, 5 Drawing Sheets

METHOD FOR CONTENT RESPONDING AND CONTENT REQUESTING, CONTENT RESPONDER AND CONTENT REQUESTOR

CROSS-REFERENCE TO RELATED APPLICATION(S)

This application is based on the Chinese Patent Application No. 200610162912.4 filed on Nov. 29, 2006, the disclosure of which is hereby incorporated by reference.

BACKGROUND OF THE INVENTION

The present invention relates to the field of information technology and, in particular, to a method for content responding, a method for content requesting, a content responder and a content requester.

At present, content is usually transmitted by using HTTP (Hypertext Transfer Protocol) between a content responder, such as a Web server, and a content requestor, such as a browser (e.g., IE(Internet Explorer), Firefox).

As is well known, the main characteristics of standard HTTP include:
1. support client/server mode;
2. connectionless; and
3. stateless.

Here "connectionless" means limiting each connection to process only one request. A server creates a connection when receiving a request from a client, and disconnects the connection after having processed and responded to the request of the client. In such manner, the burden of the server can be reduced.

"Stateless" means that the HTTP has no capability of memorizing transaction processing. The absence of the state implies that the previous information has to be re-transmitted if the information is needed by subsequent processing; this may result in a greater amount of data to be communicated every time.

FIG. 1 illustrates a process of transmitting contents between a client (content requester) 102 such as IE, and a server (content responder) 104 such as Apache web server according to the HTTP protocol in the prior art.

It shall be understood that a network (not shown) may be included between the client 102 and the server 104. The network can be a wireless network, a wired network, or the combination thereof. In addition, the network can be a local area network, a metropolitan area network, a wide area network, or the combination thereof. The client 102 and the server 104 are connected to the network via a link, respectively. The link can be a wired link or a wireless link, such as a coaxial cable, optical fiber, or satellite link, etc.

First, in step 110, a connection (TCP/IP connection) is established between the client 102 and the server 104.

Then, in step 112, the client 102 transmits a first request to the sever 104 to thereby obtain a first content from the server 104.

The following codes show an example of the request header:
Request Header:
GET /shapes/index.html HTTP/1.0
Accept: text/*
Accept: text/plain
Accept: text/html
Referer: http://9.24.104.247:8888/shapes/index.html
User-Agent: Charlotte/1.2.1 VM_ESA/1.2.2 CMS/11 via proxy gateway CERN-HTTPD/3.0 libwww/2.17

After receiving the first request, the server 104 processes the first request to generate the first content required by the first request. Furthermore, after finishing the processing of the first request, a first response is transmitted to the client 102 to thereby transmit to the client 102 the first content required by the first request, as shown in step 114. The aforesaid first content is included in the response and transmitted to the client 102 in the form of the descriptive language such as HTML (Hypertext Markup Language) and XML (Extensible Markup Language).

The following codes show an example of the response header:
Response Header:
HTTP/1.0 200 Document follows
Server: IBM-Secure-Export-ICS/4.1Beta4
Date: Thursday, 06-Jun-96 21:22:16 GMT
Content-Type: text/html
Content-Length: 457
Last-Modified: Friday, 24-May-96 15:44:07 GMT
<HTML>
...
</HTML>

Then, in step 116, the connection (TCP/IP connection) between the client 102 and the server 104 is closed.

When the client 102 needs to acquire content from the server 104 again, a connection (TCP/IP connection) is established once again between the client 102 and the server 104, as shown in step 118.

After that, in step 120, the client 120 transmits a second request to the server 104 to thereby obtain a second content from the server 104.

After receiving the second request, the server 104 processes the second request to generate the second content required by the second request. Furthermore, after finishing the processing of the second request, a second response is transmitted to the client 102 to thereby transmit to the client 102 the second content required by the second request, as shown in step 122. The aforesaid second content is included in the second response and is transmitted to the client 102 in the form of the descriptive language such as HTML and XML.

Then, in step 124, the connection (TCP/IP connection) between the client 102 and the server 104 is closed once again.

In the prior art, due to the aforesaid stateless characteristic of the HTTP, i.e. the HTTP having no capability of memorizing transaction processing, even if the aforesaid first content and second content are quite similar (for example, only several words or background colors are different, which often happens in some applications such as online bank servicing, online shopping operating, etc.), it also needs to transmit the second content completely. In other words, if the first content contains 100k bytes data, and there is only a difference of 100 bytes of data between the second content and the first content (i.e., the second content also includes about 100k bytes data), then in the prior art, it needs to transmit about 200k bytes data (the first content and the second content). Since the network bandwidth is limited in many cases, the repetitive transmission of the same content results in occupation of the limited bandwidth and increased network transmission time and client waiting time.

SUMMARY OF THE INVENTION

In order to solve the problem of waste of transmission bandwidth caused by repetitive transmission of the same or similar content by the server responding when the client sends a series requests to the server, the present invention provides a content requesting method and a content responding method of reducing the transmission of the same or similar content, and apparatus thereof.

According to a first aspect of the invention, a method for content responding is proposed, comprising the steps of: receiving a first request from a content requester via a network; generating a first content based on the first request, wherein the first content is transmitted as a first response to the first request and is buffered; receiving a second request from the content requester via the network; generating a second content based on the second request; comparing the second content with the first content; and transmitting, via the network, a second response with regard to the second request to the content requestor; wherein the second response is generated based on the result of the comparison between the first content and the second content.

According to a second aspect of the invention, a content responder is proposed, comprising: receiving means for receiving a first request and a second request in sequence from a content requestor via a network; generating means for generating the requested first content and second content based on the first request and second request, respectively; comparing means for comparing the second content with the first content; and transmitting means for transmitting to the content requester, via the network, a first response and second response with regard to the first request and second request, respectively, wherein the second response is generated based on the result of comparison between the first content and the second content by the comparing means.

According to a third aspect of the invention, a method for content requesting is proposed, comprising the steps of: transmitting, via a network, a first request for a first content to a content responder; receiving, via the network, a first response with regard to the first request from the content responder; obtaining the first content from the first response and buffering the first content; transmitting, via the network, a second request for a second content to the content responder; receiving, via the network, a second response with regard to the second request from the content responder, wherein, the second response is generated by the content responder based on the result of comparison between the first content and the second content; and acquiring the second content required by the second request based on the second response.

According to a fourth aspect of the invention, a content requester is proposed, comprising: transmitting means for transmitting, via a network, a first request and a second request in sequence to a content responder; receiving means for receiving, via the network, a first response with regard to the first request and a second response with regard to the second request from the content responder, the first response includes a first content required by the first request, the second response is generated by the content responder based on the result of comparison between the first content and the second content; acquiring means for acquiring the second content required by the second request based on the second response.

According to the invention, if there is a slight difference between the first content and the second content that are requested in sequence, it will reduce the occupation of network bandwidth, shorten the waiting time of the user receiving a response, and improve availability of the network. The present invention is particularly beneficial to the industries (for example, banking industry) that still adopt narrow-band network widely.

BRIEF DESCRIPTION OF THE DRAWINGS

Through the description taken in combination with the accompanying drawings and through a more comprehensive understanding of the present invention, other objects and effects of the invention will become more explicit and are easier to be understood, wherein.

Figure 1:
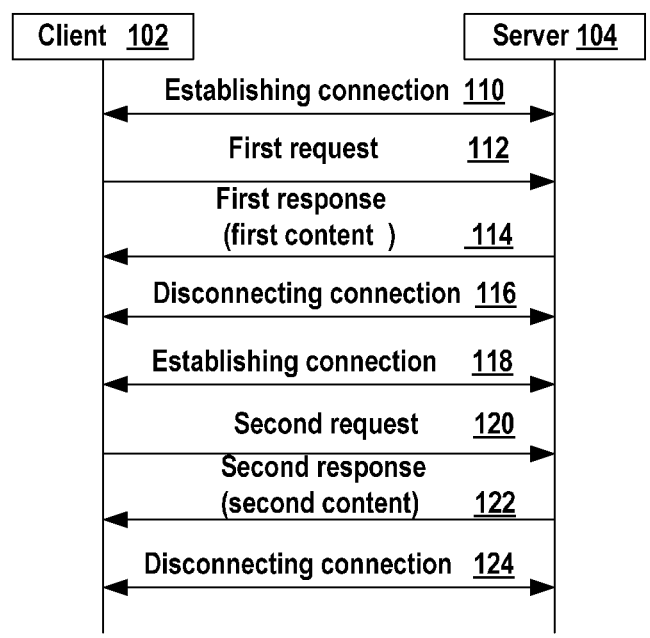
FIG. 1 illustrates a process of transmitting contents between a client and a server according to the HTTP protocol in the prior art.

In all the figures, the same signs represent the same, similar or corresponding features or functions.

DESCRIPTION OF THE INVENTION

The basic idea of the invention is to utilize the buffering mechanisms in a client (content requestor) and a server (content responder) to reduce the amount of the same or similar content transmitted within the network.

As is known to those skilled in the art, content buffering can be carried out at the client and the server.

The advantages of performing content buffering include at least one of the following: lessening the burden of the server; reducing network congestion; and shortening the waiting time of the user.

For example, through performing content buffering at the client, the client can no longer request the same content from the server when it needs to acquire the same content once again; instead, the client extracts the content from the buffer, thereby lessening the burden of the server, reducing network congestion and shortening the waiting time of the user.

Through performing content buffering at the server, the server can no longer generate the content by means of a series of operations when the client requests for the same content once again; instead the server extracts the content from the buffer to respond to the request of the user, thereby lessening the burden of the server and shortening the waiting time of the user.

It shall be appreciated that with regard to the buffering technology in the art, only when the content that is requested once again is completely identical with the buffered content and the advantages of buffering be brought into play. If the content that is requested once again is different from the buffered content, even if there is only a difference in one word, the advantages of buffering cannot be brought into play; instead the corresponding content has to be re-transmitted or re-generated.

In the present invention, in terms of the server, after a first request is received from a client, a first content required by the first request is generated. Moreover, the server contains the generated first content into a first response to the first request, and in the meanwhile, buffers the first content. After a second request is received, a second content required by the second request is generated. Then, the second content is compared with the first content that is previously generated and buffered at the server, and the difference result is generated. Based on the result of comparison, a second response with regard to the second request is transmitted to the client via the network, whereby the second response includes the difference between the second content and the first content or includes the second content itself.

In terms of the client, first of all, the client transmits a first request to a server via a network, then acquires a first content from a first response with regard to the first request received from the server. Furthermore, the client buffers the first content at the client. After that, the client transmits a second request to the server and, after receiving a second response with regard to the second request from the server via the network, acquires a second content required by the second request based on the second response and based on the previous first content locally buffered at the client.

Figure 2:
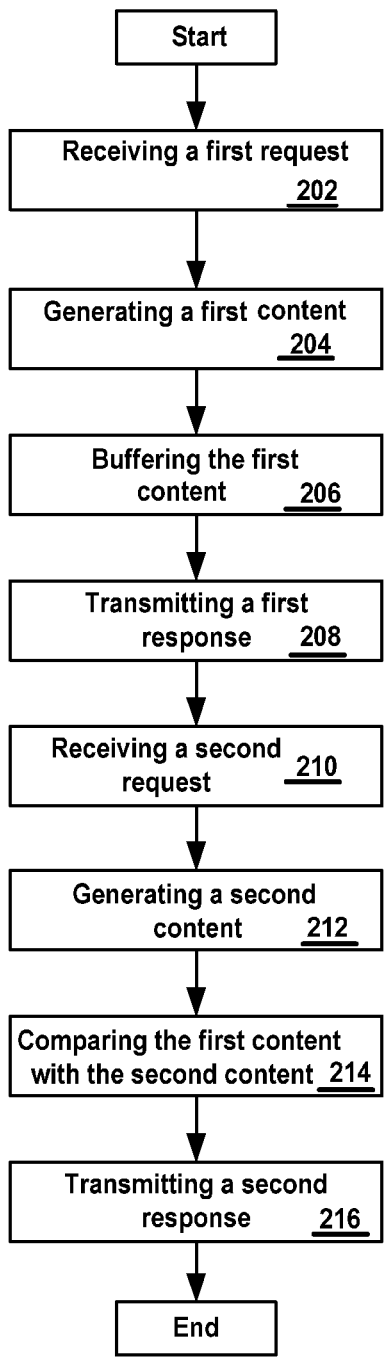
FIG. 2 illustrates a flow chart for a content responder according to an embodiment of the invention.

FIG. 2 illustrates a flow chart for a server (content responder) according to an embodiment of the invention.

First, the server receives a first request from a client (step 202).

After that, the server generates a first content for the first request (step 204). Then, the server buffers the first content (step 206). Furthermore, the server transmits a first response to the client (step 208), the first response containing the first content required by the first request. The first content is included in the response and transmitted to the client in the form of the descriptive language such as HTML and XML.

Next, the server receives a second request from the client (step 210).

Then, the server generates a second content based on the second request (step 212).

After that, the server compares the second content with the first content (step 214).

Then, based on the result of the comparison, the server transmits a second response to the client via the network, the second response only including the difference between the second content and the first content or including the second content itself (step 216).

The magnitude of the difference between the second content and the first content determines whether the second response includes the difference or the second content. If the first content is not extremely different from the second content, then in step 216, the response transmitted by the server to the client only includes the difference between the first content and the second content.

However, if the first content is too different from the second content, it is impossible to reach the effect of shortening the waiting time of the user because the data amount that is used for describing the difference between the second content and the first content is possibly greater than the data amount of the second content itself, or the client has to take much more time to acquire the content required by the second request from the difference. Therefore, in an embodiment of the invention, in step 216, only when the difference between the first content and the second content is smaller than a predetermined threshold, the server transmits to the client the second response only including the difference between the first content and the second content; otherwise, the server transmits to the client the second response only including the second content itself.

The aforesaid threshold can be dynamically altered to adapt to different situations. For example, a proportion threshold between the data amount describing the difference between the second content and the first content and the data amount of the second content itself can be set based on whether the processing capability of the client is strong or not. For example, if the processing capability of the client is stronger, while the network bandwidth is narrower, then the proportion threshold can be set bigger, for example, 80%. That is, if the proportion between the data amount describing the difference between the second content and the first content and the data amount of the second content itself is less than 80%, then the difference between the second content and the first content is generated and transmitted; if more than 80%, the second content itself is transmitted. If the client has a weaker processing capability, while the network bandwidth is broader, then the proportion threshold can be set smaller, for example, 50%.

The aforesaid threshold can also be the number of bytes of the difference between the first content and the second content.

In addition, in the above case, the response may further include a flag (flag "Difference") indicating whether the difference between the first content and the second content or the second content itself is included in the response. For example, if the flag is set as false, it means that the response only includes the second content itself; if the flag is set as true, it means that the response only includes the difference between the first content and the second content. This will help the client to judge what the response includes: the difference between the first content and the second content or the second content itself.

It is also allowable that the response does not include the aforesaid flag; instead different tags are used to describe the content and the difference for the purpose of discriminating among them.

The aforesaid difference may include adding, replacing and/or removing. Furthermore, the difference between the first content and the second content may be described based on line (because the HTML content consists of a lot of character string lines).

The following codes show a response header according to an embodiment of the invention.

Response Header:
HTTP/1.0 200 Document follows

```
Server: IBM-Secure-Export-ICS/4.1Beta4
Date: Thursday, 06-Jun-96 21:22:16 GMT
Content-Type: text/html
Content-Length: 457
Last-Modified: Friday, 24-May-96 15:44:07 GMT
Difference:<true>
<LINE1><ADD><XXXXXXXXXXXXXXXXXXX>
<LINE2><REMOVE>
<LINE3><REPLACE><XXXXXXXXXXXXXXXXXXXXXXXX>
```

It can be appreciated from the above codes that the response includes the difference between the first content and the second content (the flag Difference is set as true). Furthermore, the second content has the following differences from the first content: adding content to the first line of the first content; removing the second line of the first content; and replacing the content in the third line of the first content.

Besides the above manner of describing the difference between two contents based on line, the difference between the contents can also be described based on bytes or paragraphs. The difference between the contents can be described using any method in the art.

In addition, the server may employ the session mechanism well known to those skilled in the art to make sure that the first request and the second request come from the same client.

In other words, although as mentioned above, HTTP is connectionless and stateless, using the session mechanism, it can ensure that the first request and the second request come from the same client.

Moreover, after generating the second content, the server may use the second content to overlay the first content. That is to say, the server deletes the first content and only buffers the second content. After receiving a third request from the client, the server generates the corresponding third content, and before transmitting the third content, the server compares the third content with the second content to determine the difference therebetween, and so on. This is advantageous to realize the invention more simply because only the corresponding content of the latest request is buffered, and during comparison, only the buffered corresponding content of latest request is adopted, there is no need to make a selection among a plurality of buffered contents to select which buffered content is closest to the generated content.

Certainly, it can also be done like this, that is, after generating the second content, the server does not delete the first content at the same time of buffering the second content. Thus, after the server receives the third request from the client and generates the corresponding third content, the server may compare the third content with the first content and the second content to select which buffered content is closest to the generated third content. This is advantageous to find the buffered content that is closest to the generated content (because the following case is possible: with regard to the first content and the second content, the third content is possibly closer to the first content), whereas the disadvantage is that it needs to compare with all buffered contents and also needs to notify the client (the client also needs to buffer respective contents) that the currently transmitted difference is the difference between the third content and which buffered content. The server can allocate a unique identifier to respective contents that are transmitted every time, as a basis of identifying the content; it is allowable that the URL, which is adopted by the client to access the content, is used to identify the accessed content.

In another embodiment, the server and the client both store a history record of the requested content within a certain period of time, and assign a unique identifier to the content corresponding to each request. After receiving a request, the server first generates the content required by the request, then rapidly searches the similar content previously accessed in the history record to the client that sends the request using the keyword (for example, URL, etc.) extracted from the request or the generated content, computes the difference between the generated content and the searched similar content, and determines whether the difference or the generated content is returned as a response to the current request. If it is determined that the difference is returned, the response shall include the identifier of the previous content on which the difference is based, so as to facilitate the client in finding, based on the identifier, the basis of acquiring the required content from the returned difference in the previously buffered contents.

Figure 3:
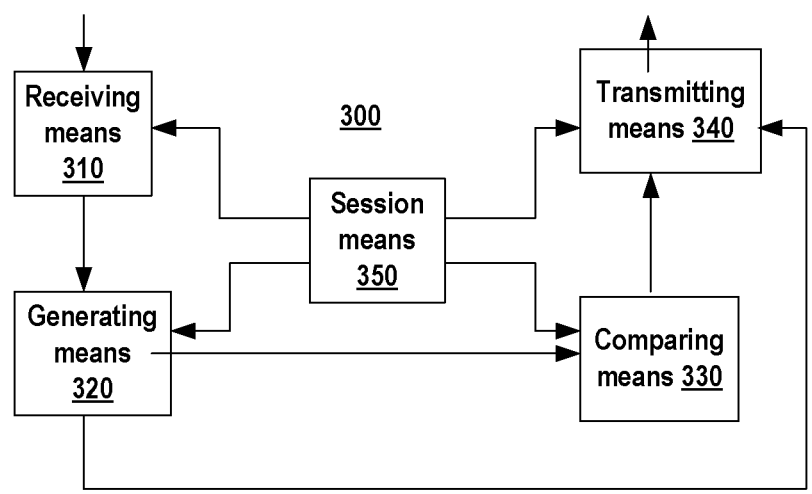
FIG. 3 illustrates a block diagram of a content responder according to an embodiment of the invention.

FIG. 3 illustrates a block diagram of a content responder according to an embodiment of the invention.

As shown in FIG. 3, the content responder 300 comprises receiving means 310 for receiving, via a network, a first request and a second request in sequence from a content requestor; generating means 320 for generating the required first content and second content based on the received first request and second request; comparing means 330 for comparing the second content with the first content; and transmitting means 340 for transmitting a second response to the content requester via the network based on the result of comparison. The second response may be the difference between the second content and the first content, or the second content itself. It shall be appreciated that the content responder 300 may also comprise a storage means (not shown) for buffering the generated content.

In an embodiment of the invention, if the difference between the first content and the second content is less than a predetermined threshold, the transmitting means 340 transmits a second response that includes the difference between the first content and second content; otherwise, the transmitting means 340 transmits a second response that includes the second content.

In another embodiment of the invention, the second response transmitted by the transmitting means 340 includes a flag indicating whether the difference between the first content and the second content or the second content is included in the second response.

As stated above, the difference may include the portions describing the adding, replacing and/or removing of the second content relative to the first content.

The content responder 300 further comprises session means 350 for using session mechanism to ensure that the first request and second request come from the same content requester.

Figure 4:
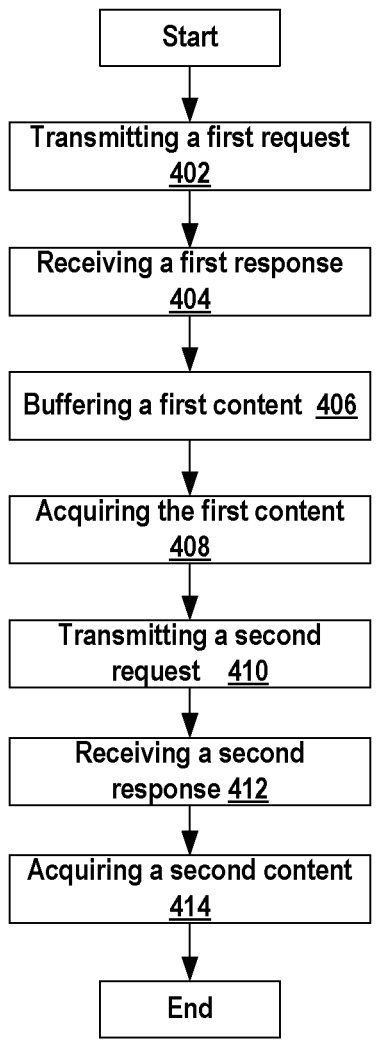
FIG. 4 illustrates a flow chart for a content requester according to an embodiment of the invention.

FIG. 4 illustrates a flow chart for a client (content requester) according to an embodiment of the invention.

First, the client transmits a first request to a server (step 402).

Then, the client receives, from the server, a first response including a first content required by the first request and generated by the server (step 404). The aforesaid first content is included in the response in the form of the descriptive language such as HTML, XML, etc. After that, the client buffers the first content (step 406). Then, the client acquires the first content (step 408).

Next, the client transmits a second request to the server (step 410).

Then, the client receives, from the server, a second response with regard to the second request (step 412). The response is transmitted based on the result of comparison between the second content and the first content, wherein the second content is generated by the server based on the second request. The first content is generated and buffered by the server based on the first request transmitted prior to the second request.

Then, the client acquires the second content required by the second request based on the second response (step 414).

As stated above, according to the result of comparison between the second content and the first content, the second response generated by the server may include the difference between the first content and the second content or the second content itself.

As stated above, the server determines, according to whether the difference between the first content and the second content is less than a predetermined threshold, whether a response including the difference between the first content and second content, or a response including the second content is transmitted to the client.

In this case, if the response includes the difference between the first content and second content, the client acquires the content for the second request by combining the difference with the first content; if the response directly includes the second content, then the client directly acquires the content for the second request by directly acquiring the second content.

As stated above, the response may also include a flag indicating whether the difference between the first content and the second content or the second content is included in the response. The client determines, via this flag, whether the difference between the first content and the second content or the second content is included in the response, and performs corresponding operation.

In addition, the client may use the session mechanism well known to those skilled in the art to make sure that the first request and the second request come from the same client.

As stated above, after generating the second content, the server may use the second content to overlay the first content. That is to say, the server deletes the first content and only buffers the second content.

In this case, the client can also use the second content to overlay the first content after acquiring the second content (acquiring directly from the server or acquiring by combining the buffered first content with the difference between the first content and the second content received from the server). That is to say, the client deletes the first content and only buffers the second content.

As stated above, after generating the second content, the server does not delete the first content at the same time of buffering the second content.

In this case, the buffering processing of the acquired content by the client shall be kept consistent with that by the server; that is, after acquiring the second content, likewise, the client does not delete the first content at the same time of buffering the second content.

In summary, those skilled in the art shall appreciate that the client and server shall match to each other. In other words, it needs to extend the client to cooperate with the novel function of the server.

Figure 5:
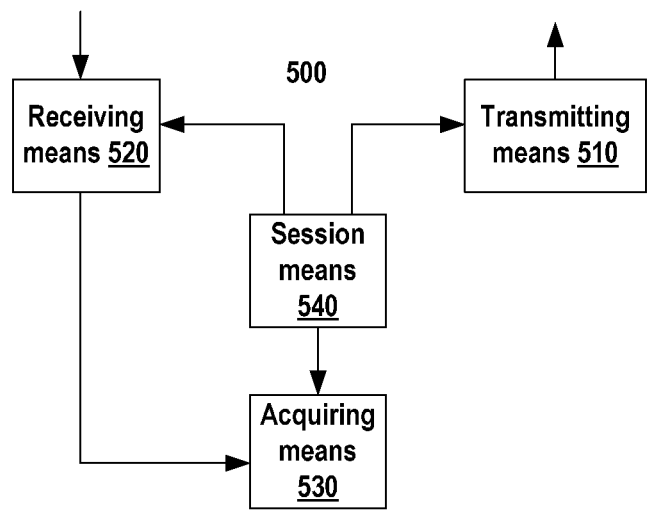
FIG. 5 illustrates a block diagram of a content requester according to an embodiment of the invention.

FIG. 5 illustrates a block diagram of a content requester according to an embodiment of the invention.

As shown in this figure, the content requester 500 comprises transmitting means 510 for transmitting, via a network, a first request and a second request in sequence to a content responder. It further comprises receiving means 520 for receiving, via the network, a first response with regard to the first request and a second response with regard to the second request from the content responder. The second response is transmitted based on the result of comparison between the second content and the first content, wherein the second content is generated by the content responder based on the second request and the first content is generated by the content responder based on the first request that is transmitted by the content requester 500 before the second request and is previously buffered by the content responder. The content requester 500 further comprises acquiring means 530 for acquiring the content for the second request based on the second response. It shall be appreciated that the content requestor 500 may further comprise a storage means (not shown) for buffering the acquired content.

As stated above, if the difference between the first content and the second content is less than a predetermined threshold, the second response includes the difference between the first content and the second content. Then the acquiring means 530 acquires the content for the second request by combining the difference with the first content that is generated and transmitted by the content responder based on the first request, and is received and locally buffered by the content requester 500. If the response directly includes the second content, then the acquiring means 530 acquires the content for the second request by directly acquiring the second content.

As stated above, the response may further include a flag indicating whether the difference between the first content and the second content or the second content is included in the response. In this case, the acquiring means 530 determines, via the flag, whether the difference between the first content and the second content or the second content is included in the response.

In addition, the content requester 500 further comprises session means 540 for ensuring, using session mechanism, that the first request and the second request come from the same content requestor.

In the above embodiments, the content requester and the content responder can delete the buffered contents; for example, if a content has buffered exceeding one hour, the content requester and the content responder delete the content to free the storage space. Of course, it should be appreciated that the processing to the buffered contents of the content requester should be consistent with that of the content responder.

It shall be appreciated that the present invention is not limited to a browser-based application; instead the invention can be applied to any HTTP-based application, for example, Rich Client Platform, SOA (Service Oriented Architecture) Appliance Application, etc., as long as the content responder and the content requester have the extending capabilities of difference computing and combining.

The present invention further can be implemented as a computer program product, which comprises the codes for implementing the above methods. Before using, the codes can be stored in the memory of a computer system. For example, the codes may be stored on a computer readable storage medium. As used in the present specification and the appended claims, the term "computer readable storage medium" does not encompass a signal or any medium that is not physically tangible. For example, the codes can be stored in the hard disk or movable disk such as optical disk or floppy disk, or can be downloaded via Internet or other computer network.

The invention as described above is particularly adapted to the transaction via narrow band. There are a lot of applications at present, for example, the insurance terminals, or the bank sites in the second or third levels of cities dialing with Modem to access network. At this time there is a very restrict demand for the network bandwidth. In this case, the invention can be employed to reduce the requirement for the network bandwidth at an expense of the increased burden of the server. On the other hand, the performance of the server will be improved rapidly with the fast development of the hardware technology. However, the development speed of the network bandwidth is far lower than that of hardware technology (for example, the existing ADSL technique has been used for ten years, but does not have any improvement yet).

It shall be noted that in order to facilitate better understanding of the invention, the above description omits some specific technical details that are well known to those skilled in the art and are possibly necessary to the implementation of the invention.

The purpose of providing the specification of the invention is to explain and describe, instead of being used for exhaustion or limiting the invention as the disclosed form. To those ordinarily skilled in the art, many modifications and changes are obvious.

Therefore, the embodiments are selected and described for better explaining the principle of the invention and the actual application thereof, and enable those ordinarily skilled in the art to understand that all modifications and alterations made without departing from the spirit of the present invention fall into the protected scope of the present invention as defined in the appended claims.

What is claimed is:

1. A method for content responding, comprising:
   receiving a first request via a network from a content requestor;
   generating a first content based on the first request;
   transmitting the first content as a first response via the network to the content requestor;
   storing the first content;

receiving a second request via the network from the content requestor;

generating a second content based on the second request;

comparing the second content with the first content to generate a difference between the first content and the second content;

generating a second response based on the difference between the first content and the second content; and transmitting the second response via the network to the content requestor;

wherein generating a second response based on the difference between the first content and the second content further comprises:

generating the second response to include the second content based upon a determination that the difference between the first content and the second content is greater than a predetermined threshold; and generating the second response to include the difference between the first content and the second content based upon a determination that the difference between the first content and the second content is less than a predetermined threshold.

2. The method according to claim 1, wherein generating a second response based on the difference between the first content and the second content further comprises:

generating a flag indicating whether the second response includes the second content or the difference between the first content and the second content.

3. The method according to claim 1, wherein the difference between the first content and the second content is:

the second content adding a new content on the basis of the first content;

the second content replacing a part of content on the basis of the first content; or the second content removing a part of content on the basis of the first content.

4. The method of claim 1, further comprising:

employing a session mechanism to ensure that the first request and the second request are received from the same content requestor.

5. A method for content requesting, comprising the steps of:

transmitting, via a network to a content responder, a first request for a first content;

receiving, via the network from the content responder, a first response with regard to the first request, said first response comprising the first content;

acquiring the first content from the first response;

buffering the first content;

transmitting, via the network to the content responder, a second request for a second content;

receiving, via the network from the content responder, a second response with regard to the second request, said second response based on a difference between the first content and the second content; and acquiring the second content from the second response;

wherein acquiring the second content from the second response further comprises:

acquiring the second content directly from the second response upon a determination that the second response includes the second content; and acquiring the second content by combining the difference between the first content and the second content with the first content upon a determination that the second response includes the difference between the first content and the second content.

6. The method according to claim 5, wherein the second response further comprises:

a flag indicating whether the second response includes the second content or the difference between the first content and the second content.

7. The method according to claim 5, wherein the difference between the first content and the second content is:

the second content adding a new content on the basis of the first content;

the second content replacing a part of content on the basis of the first content; or the second content removing a part of content on the basis of the first content.

8. The method according to claim 5, further comprising:

employing at a client a session mechanism to ensure that the first request and the second request come from the same client.

9. A computer program product for content responding comprising a computer readable storage device having computer usable program code embodied therewith, said computer usable program code comprising:

computer usable program code configured to receive a first request via a network from a content requestor;

computer usable program code configured to generate a first content based on the first request;

computer usable program code configured to transmit the first content as a first response via the network to the content requestor;

computer usable program code configured to store the first content;

computer usable program code configured to receive a second request via the network from the content requestor;

computer usable program code configured to generate a second content based on the second request;

computer usable program code configured to compare the second content with the first content to generate a difference between the first content and the second content;

computer usable program code configured to generate a second response based on the difference between the first content and the second content; and computer usable program code configured to transmit the second response via the network to the content requestor;

wherein the computer usable program code configured to generate a second response based on the difference between the first content and the second content further comprises:

computer usable program code configured to generate the second response to include the second content based upon a determination that the difference between the first content and the second content is greater than a predetermined threshold; and computer usable program code configured to generate the second response to include the difference between the first content and the second content based upon a determination that the difference between the first content and the second content is less than a predetermined threshold.

10. The computer program product according to claim 9, wherein the computer usable program code configured to generate a second response based on the difference between the first content and the second content further comprises:

computer usable program code configured to generate a flag indicating whether the second response includes the second content or the difference between the first content and the second content.

11. The computer program product according to claim 9, wherein the difference between the first content and the second content is:
- the second content adding a new content on the basis of the first content;
- the second content replacing a part of content on the basis of the first content; or
- the second content removing a part of content on the basis of the first content.

12. The computer program product of claim 9, further comprising:
- computer usable program code configured to employ a session mechanism to ensure that the first request and the second request are received from the same content requestor.

* * * * *